United States Patent [19]

Deshpande

[11] Patent Number: 5,802,377
[45] Date of Patent: Sep. 1, 1998

[54] METHOD AND APPARATUS FOR IMPLEMENTING MULTIPLE INTERRUPT CONTROLLERS IN A MULTI-PROCESSOR COMPUTER SYSTEM

[75] Inventor: Sanjay Raghunath Deshpande, Austin, Tex.

[73] Assignee: International Business Machines Corp., Armonk, N.Y.

[21] Appl. No.: 734,806

[22] Filed: Oct. 22, 1996

[51] Int. Cl.$^6$ ................................................ G06F 9/46
[52] U.S. Cl. ............................................................. 395/733
[58] Field of Search ................................. 395/733, 739, 395/740

[56] References Cited

U.S. PATENT DOCUMENTS

| | | |
|---|---|---|
| 4,751,727 | 6/1988 | Brahm et al. . |
| 5,283,904 | 2/1994 | Carson et al. . |
| 5,353,415 | 10/1994 | Wolford et al. . |
| 5,434,997 | 7/1995 | Landry et al. . |
| 5,437,042 | 7/1995 | Culley et al. . |
| 5,438,677 | 8/1995 | Adams et al. . |
| 5,446,910 | 8/1995 | Kennedy et al. . |
| 5,465,360 | 11/1995 | Miller et al. . |

*Primary Examiner*—Glenn A. Auve
*Attorney, Agent, or Firm*—Richard A. Henkler

[57] ABSTRACT

A method and apparatus for providing a distributed implementation of an interrupt delivery controller in a multi-processor environment while maintaining compliance with the OpenPIC specification. Specifically, an interrupt delivery controller is maintained for each one of the central processing units. Whenever one of the central processing units resets its corresponding interrupt delivery controller, logic is used to select it as the primary interrupt controller. The primary interrupt controller coordinates the resetting of the secondary interrupt controller(s) and interrupt source units so that virtually an unlimited number of interrupt source units can be used in the system.

20 Claims, 5 Drawing Sheets

METHOD AND APPARATUS FOR IMPLEMENTING MULTIPLE INTERRUPT CONTROLLERS IN A MULTI-PROCESSOR COMPUTER SYSTEM

BACKGROUND

1. Field of the Present Invention

The present invention generally relates to interrupt controllers, and more specifically, to implementations of multiple interrupt controllers in a multi-processor system.

2. History of Related Art

The OpenPIC standards committee has recently defined an Open Peripheral Interrupt Controller (Open PIC) Architecture for multiprocessor computer systems. The primary purpose of OpenPIC is to provide uniformity and compatibility within the industry for implementations of interrupt controllers. Specific information concerning OpenPIC is explained in "OpenPIC Register Interface Specification Revision 1.2", issued by Advanced Micro Devices and Cyrix Corporation (referred to hereinafter as OpenPIC), and is hereby incorporated by reference herein.

In general, OpenPIC defines a generic interrupt controller. Thus, allowing the industry to develop many different complying implementations, as well as solutions for the many different problems that arise therefrom. One such problem, is that the current definition supplied by OpenPIC for the generic interrupt controller requires unnecessary multiplicity of signals paths, and longer interrupt response latency resulting therefrom.

It would, therefore, be a distinct advantage to have an apparatus and method that would use a distributed implementation of the interrupt controller as defined by OpenPIC to avoid the above noted problems. The present invention provides such a method and apparatus.

SUMMARY OF THE PRESENT INVENTION

In one aspect the present invention is an apparatus, in a multi-processor computer, for processing interrupts to each one of the central processing units. The apparatus includes a plurality of interrupt source means; each one for creating and transmitting interrupt signals having an indication of the status of the interrupt source means. Each one of the interrupt source means includes means for receiving a reset interrupt control signal, and for altering the status of the interrupt source means in response thereto.

The apparatus further includes a plurality of secondary interrupt delivery means for receiving and processing interrupt signals. Each one of the secondary interrupt delivery means includes means for receiving a master reset interrupt control signal, and for altering the status of the secondary interrupt delivery means in response thereto. The secondary interrupt delivery means also includes means for transmitting an acknowledgement signal in response to altering the status.

The secondary interrupt delivery means further includes means for discarding received interrupt signals that indicate a status different from that of the interrupt delivery means. The secondary interrupt delivery means also includes means for transmitting to each one of the secondary delivery units under the control of the secondary interrupt delivery means the reset interrupt control signal.

The apparatus also includes a primary interrupt delivery means for receiving and processing interrupt signals. The primary interrupt delivery means includes means for altering, upon receiving a reset signal, the status of the primary interrupt delivery means in response thereto. The primary interrupt delivery means also includes means for transmitting, upon receiving the reset signal, a master reset interrupt control signal to each of the secondary interrupt delivery means. The primary interrupt delivery means further includes means for receiving an acknowledgement signal from each of the secondary interrupt delivery means. The primary interrupt delivery means also includes means for discarding received interrupt signals that indicate a status different from that of the interrupt delivery means.

The primary interrupt delivery means includes means for transmitting, in response to receiving the reset signal, the reset interrupt control signal. The primary interrupt delivery means also includes means for altering the status of the primary interrupt delivery means to its prior status in response to receiving an acknowledgement from each of the secondary interrupt delivery means.

In yet another aspect, the present invention is a method, in a multi-processor computer, of processing interrupts to each one of the central processing units. The method includes the step of creating a plurality of first interrupt signals using a first interrupt source unit. Each one of the first interrupt signals indicating the status of the first interrupt source unit. The method also includes the step of creating a plurality of second interrupt signals using a second interrupt source unit. Each one of the second interrupt signals indicating the status of the second interrupt source unit.

The method further includes the step of assigning a first and second interrupt delivery unit to a first and second central processor, respectively. The method further includes the step of resetting the first interrupt delivery unit whereby the status of the first interrupt delivery unit is different from that of the first interrupt source unit.

The method further includes the step of transmitting, with the first interrupt delivery unit, a master reset signal to the second interrupt delivery unit. The method also includes the step of altering, in response to receiving the master rest signal, the status of the second interrupt delivery unit. The method further includes the step of transmitting an acknowledgement signal to the first interrupt delivery unit in response to altering the status of the second interrupt delivery unit.

The method also includes the step of altering, in response to receiving the acknowledgement signal, the status of the first interrupt delivery unit to its prior state. The method further includes the step of discarding each one of the first interrupt signals that indicate a status different from that of the first interrupt delivery unit. The method also includes the step of discarding each one of the second interrupts signals that indicate a status different from that of the second interrupt delivery unit.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT OF THE PRESENT INVENTION

Figure 1:
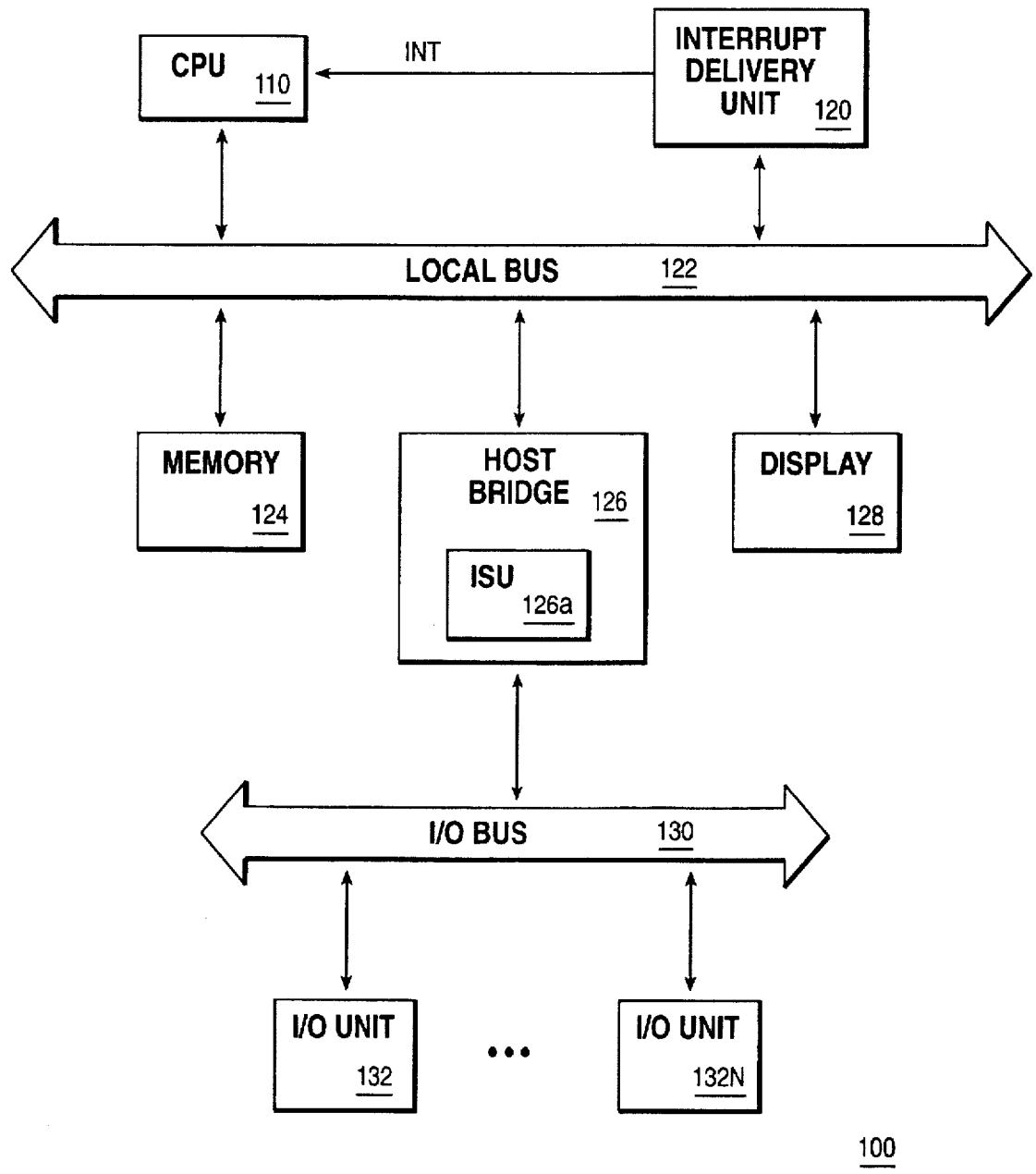
FIG. 1 is a block diagram of a data processing system in which a first preferred embodiment of the present invention can be practiced.

Reference now being made to FIG. 1, a block diagram is shown of a Data Processing System 100 in which a first preferred embodiment of the present invention can be practiced. The Data Processing System 100 includes a Central Processing Unit (CPU) 110, an Interrupt Delivery Unit (IDU) a 120, Memory 124, a Host Bridge 126, and a Display 128. Communication between the above elements is provided via Local Bus 122. Data Processing System 100 also includes an I/O bus 130 having I/O Units 132–132N connected thereto. Host Bridge 126 provides the means for communication between the Local Bus 122 and the I/O Bus 130.

Many of the above elements are well known and understood by individuals of ordinary skill in the art, and therefore, detailed discussion of them is deemed unnecessary. Consequently, only those elements that may require additional elaboration by individuals of ordinary skill in the art explained hereinafter.

In the first preferred embodiment of the present invention, the OpenPIC standard is implemented in a distributed fashion via an Interrupt Delivery Unit (IDU) containing registers for each processor (for presenting interrupts to the processor (s)), global registers, InterProcessor Interrupt and timer facilities, and an optional I/O interrupt group.

In the first preferred embodiment, I/O interrupt groups (other) are distributed among one or more Interrupt Source Units (ISUs) that exist as either separate physical entities, or as part of other entities such as bridge chips, among the I/O bases of the Data Processing System 100. Interrupt Delivery Unit (IDU) 120 and ISU 126A represent this distributed implementation.

Communication between the IDU 120 and ISU(s) 126A is accomplished by using Address Only Transactions. Thus, any I/O interrupts reported by the ISU(s) 126A is communicated to the IDU 120 via Address Only Transactions. More detailed information concerning the IDU 120 and ISU 126A is discussed in connection with FIG. 2.

Figure 2:
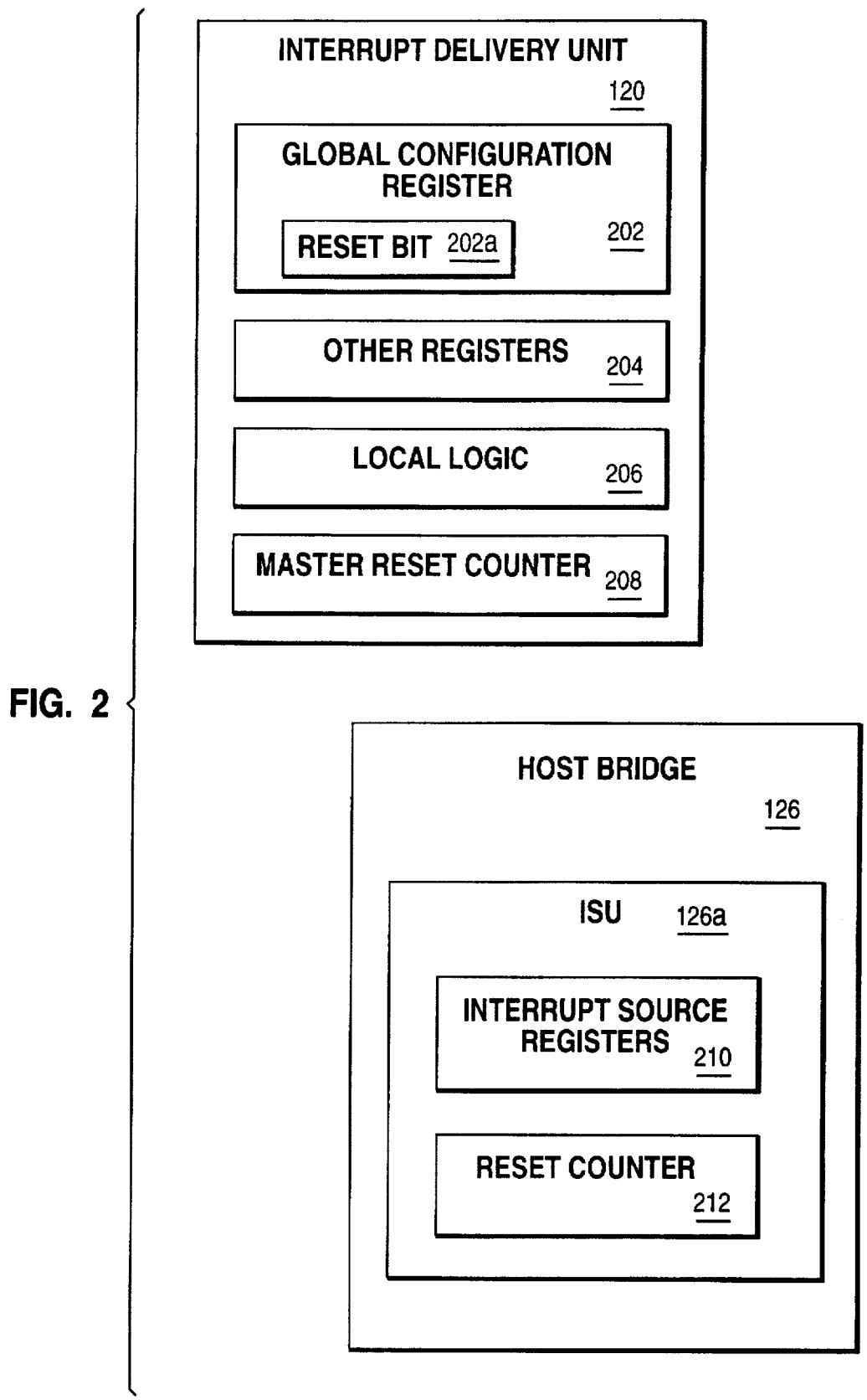
FIG. 2 is a block diagram illustrating in greater detail the elements of the Interrupt Delivery Unit (IDU) and the Host Bridge of FIG. 1 according to the teachings of the first preferred embodiment of the present invention.

Reference now being made to FIG. 2, a block diagram is shown illustrating in greater detail the elements of the IDU 120 and the Host Bridge 126 of FIG. 1 according to the teachings of the first preferred embodiment of the present invention. The IDU 120 includes a Global Configuration Register 202 having a Reset Bit 202A, Other Registers 204, Local Logic 206, and Master Reset Counter 208. Specific information concerning the content of the Registers 202 and 204 can be found in the OpenPIC document incorporated previously.

Whenever the CPU 110 desires to reset the IDU 120, the Reset Bit 202A is set to an active value of one. After the IDU 120 has been reset, the Reset Bit 202A is reset to an inactive state of zero. The net effect of resetting the IDU 120 is to return the control registers (global configuration registers 202, other registers 204, in both the central and peripheral units) to their default states, and to reset Local Logic 206.

The ISU 126A includes Interrupts Source Registers 210 and a Reset Counter 212. The ISU 126A transmits I/O interrupt packets to the IDU 120 for processing. The interaction between the IDU 120 and the ISU 126A is explained in greater detail in connection with FIG. 3.

Figure 3:
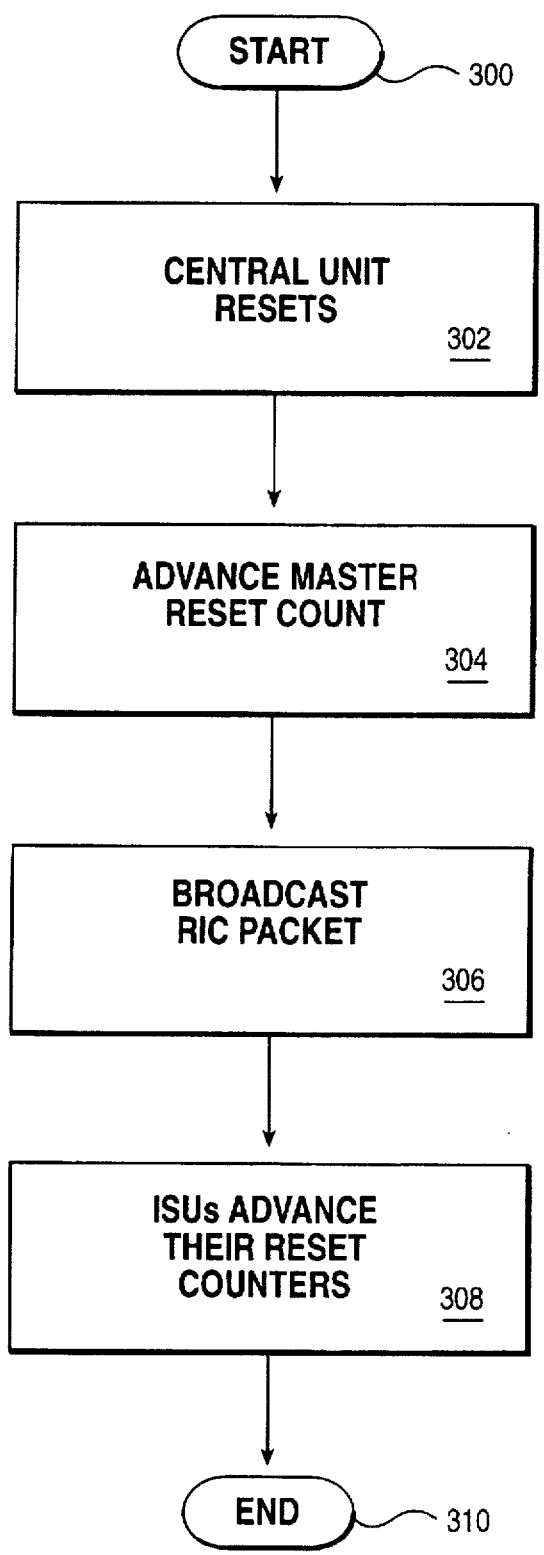
FIG. 3 is a flow chart comprising the steps performed by the IDU upon receiving a reset command from the Central processing Unit of FIG. 1 according to the teachings of the first preferred embodiment of the present invention.

Reference now being made to FIG. 3, a flow chart is shown comprising the steps performed by the IDU 120 upon receiving a reset command from the Central Processing Unit 110 according to the teachings of the first preferred embodiment of the present invention. The method begins at step 300 where the reset bit 202A (FIG. 2) is set by the CPU 110. The method then proceeds to step 302 where the IDU 120 resets its local logic 206, other registers 204, and global configuration register 202. Thereafter, the method proceeds to step 304 where the IDU 120 advances the count of the Master Reset Counter 208.

The method then proceeds to step 306 where the IDU 120 broadcast a Reset Interrupt Controller (RIC) packet to all ISUs in the system 100. The RIC packet includes an indication of the value of the Master Reset Counter 208. The method then proceeds to step 308 where each of the ISUs receiving this RIC packet resets their local logic, Interrupt Source Registers, and Reset Counter 212. In this example, ISU 126A would receive the RIC packet, thus, resetting its Interrupt Source Registers 210 and setting its Reset Counter 212 to the new value specified by the RIC packet. The method then proceeds to end at step 310.

In the first preferred embodiment of the present invention, each I/O interrupt packet carries the value of the Reset Counter 212 with them. When the IDU 120 receives these I/O interrupt packets it compares the indicated value with the value of its Master Reset Counter 208. If these values are not identical, then the received I/O interrupt packet is invalid (i.e. generated before the resetting of the IDU 120) and discarded.

Thus, it can be seen that I/O interrupt packets which are enroute during the reset of the IDU 120 will carry a previous reset generation identity. Consequently, the Interrupt Delivery Unit 120 is able to capitalize upon this facet and identify the I/O interrupt packet as invalid. It should also be noted that the above described method advantageously avoids the time consuming and resource taxing requirement that each ISU send an exclusive acknowledgement of receipt of the RIC Packet to the Interrupt Delivery Unit 120. Consequently, the IDU 120 is not required to wait to receive such acknowledgements in order to reset the Reset Bit 202A. As a result thereof, the number of ISUs can be left unspecified.

Figure 4:
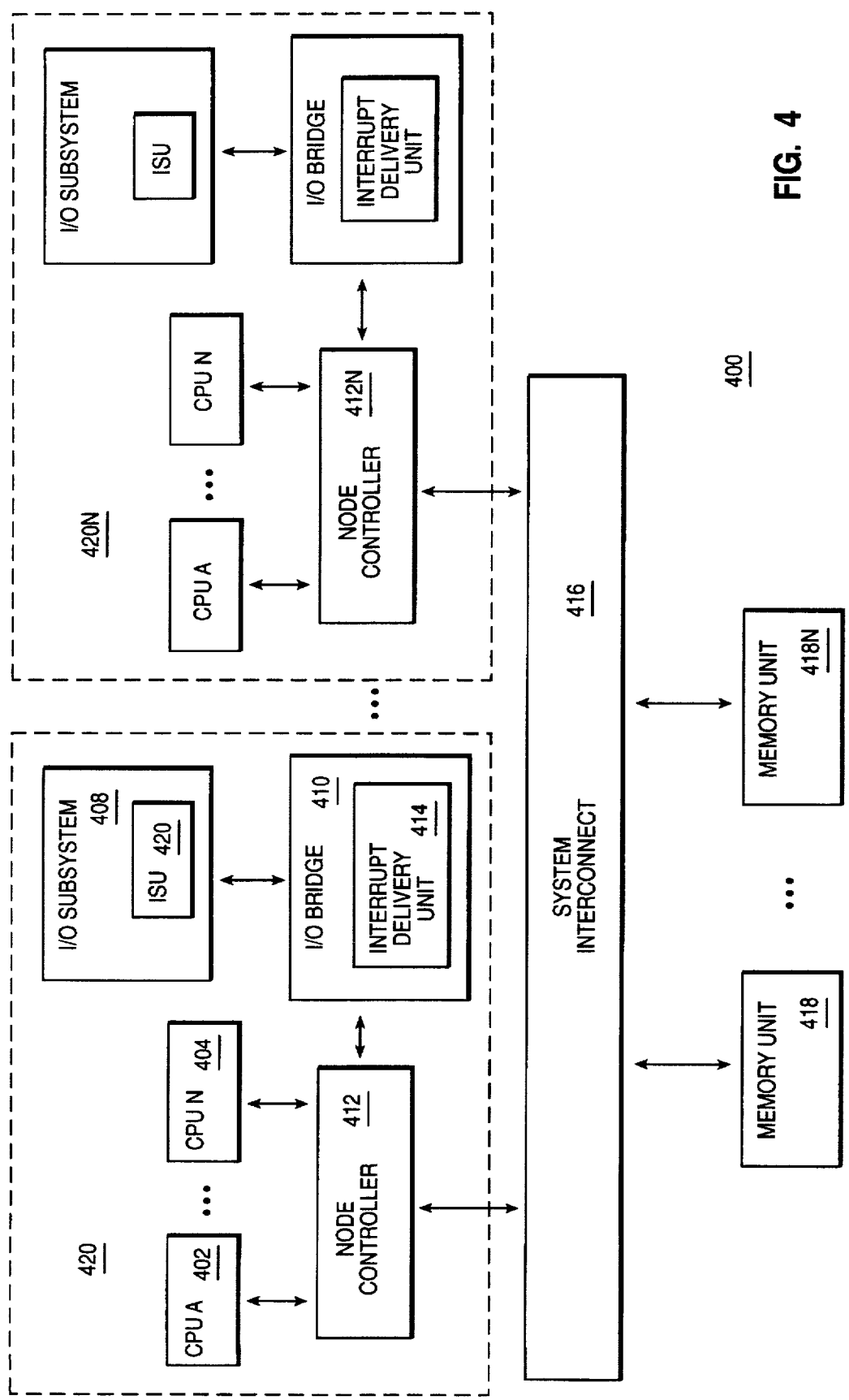
FIG. 4 is a block diagram of a data processing system in which a second preferred embodiment of the present invention can be practiced.

Reference now being made to FIG. 4, a block diagram is shown of a data processing system 400 in which a second preferred embodiment of the present invention can be practiced. As shown in FIG. 4, the second preferred embodiment involves multiple ISUs and Interrupt Delivery Units.

The data processing system 400 includes a plurality of nodes 420–420N, and a plurality of memory units 418–418N, each of which are coupled to System Interconnect 416 (e.g. Bus) for communication therebetween. Each of the nodes 420–420N includes a node controller 412, a plurality of CPUs 402–404, an I/O Subsystem 408, and an I/O Bridge 410. Node 420 is representative of nodes 420A–420N and the discussion provided therewith is equally applicable to nodes 420A–420N.

Many of the above noted components are well known and their use understood by those of ordinary skill in the art to which the present invention pertains, and therefore, detailed discussion of their various functions and operations is deemed unnecessary. Consequently, only those components that may require additional elaboration by individuals of ordinary skill in the art are explained hereinafter.

As noted in FIG. 4, each I/O sub-system 408–408N includes an ISU unit 420. Node Controller 412 also includes an Interrupt Delivery Unit 414 (IDU). The IDU 414 and ISU 420 are similar in many aspects to IDU 120 (FIG. 2) and ISU 126A (FIG. 2), respectively. Consequently, only the additional functionality added to the IDU 414N and ISU 420N is discussed hereinafter in connection with FIG. 5.

Figure 5:
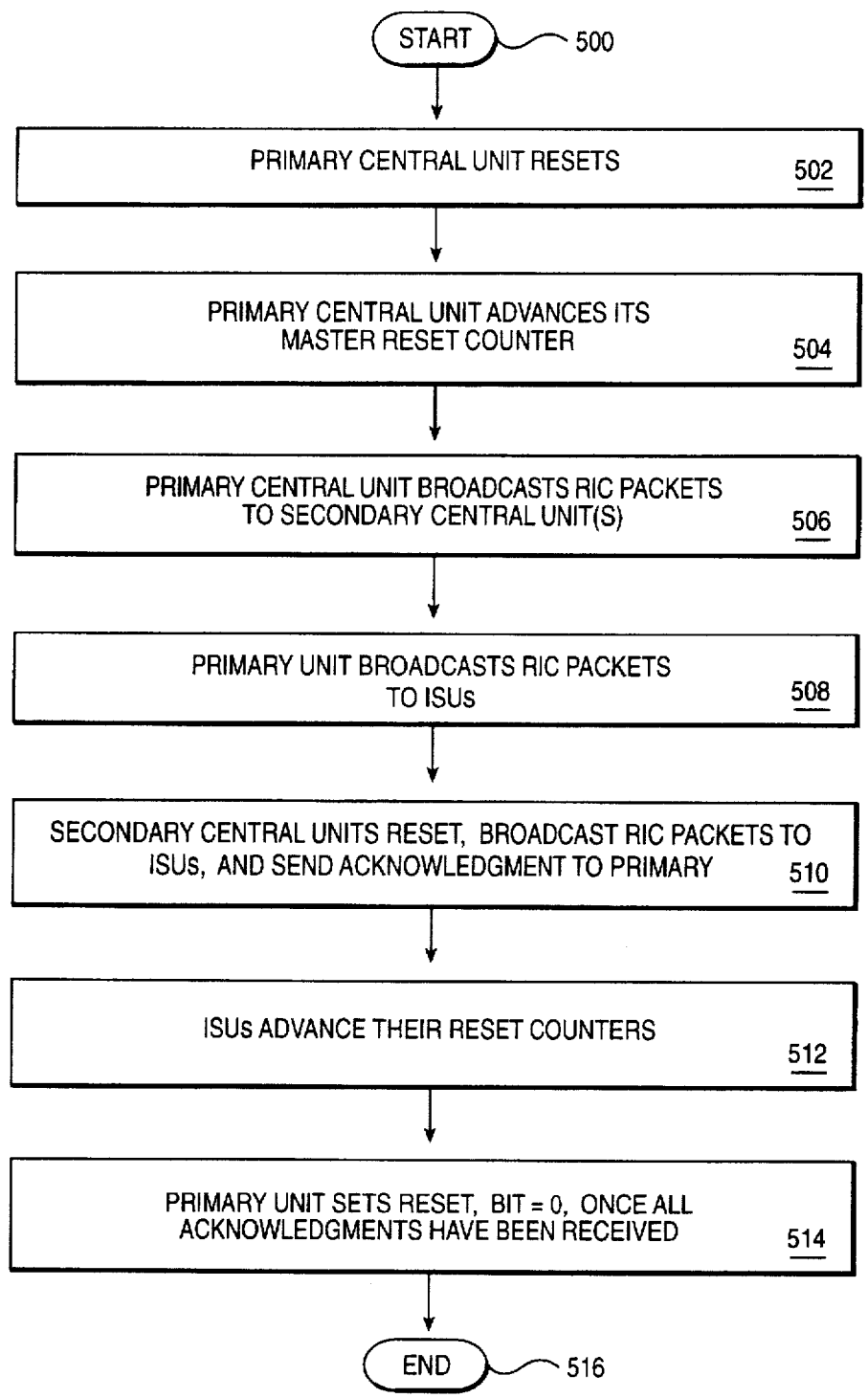
FIG. 5 is a flow chart comprising the steps executed by a selected one of the IDUs (FIG. 4) after receiving a reset command from one of the CPUs of FIG. 4 according to the teachings of the second preferred embodiment of the present invention.

Reference now being made to FIG. 5, a flow chart is shown illustrating the steps executed by a selected one of the IDUs 414–414(N) after receiving a reset command from one of the CPUs 402(N)–404(N) according to the teachings of the second preferred embodiment of the present invention. In the second preferred embodiment, only a single IDU 414–414(N) can receive a reset command from its supported CPU(s) at any given time. Consequently, the receiving IDU 414–414N is referred to hereinafter as the primary IDU.

With continuing reference to FIG. 5, the method begins at step 500 upon the receipt by one of the IDUs 414–414(N) of a reset command from one of the CPUs 402(N)–404(N). In this example, it can be assumed that IDU 414 receives a reset a command from CPU N 404. As previously stated, the IDU receiving the reset command is referred to as the primary IDU.

The method then proceeds to step 502 where the primary IDU 414 resets in a fashion similar to that discussed in connection with FIG. 2. Thereafter, the method proceeds to step 504 where the primary IDU 414 advances its Master Reset Counter 208. Thereafter, the method proceeds to step 506 where the primary IDU 414 broadcasts Reset Interrupt Control (RIC) packets to the remaining secondary IDUs 414A–414N. The method then proceeds to step 508 where the primary IDU 414 broadcasts RIC packets to the ISU(s) 420 under its control. Upon receiving the RIC packets, at step 510, the remaining secondary IDUs 414A–414N reset, broadcast RIC packets to ISU(s) under their control, and transmit an acknowledgement to the primary IDU 414.

Thereafter, the method proceeds to step 512 where each of the ISU(s), receiving the RIC packet, advance their Reset Counters as previously discussed in connection with FIG. 2. The method then proceeds to step 514 where upon receiving acknowledgements from all secondary IDUs 414A–414N, the primary IDU 414 sets its Reset Bit equal to zero. Thereafter, the method proceeds to end at step 516.

It should be noted, that the handling of interrupt packets by each of the IDUs 414–414N is identical to that previously discussed in connection with IDU 120 of FIG. 2.

It is thus believed that the operation and construction of the present invention will be apparent from the foregoing description. While the method and system shown and described has been characterized as being preferred, it will be readily apparent that various changes and/or modifications could be made wherein without departing from the spirit and scope of the present invention as defined in the following claims.

What is claimed is:

1. In a multi-processor computer having a plurality of central processor units, an apparatus for processing interrupts to each one of the processor units, the apparatus comprising:

a plurality of interrupt source means, each one for creating and transmitting interrupt signals having an indication of the status of the interrupt source means, each interrupt source means including:

means for altering, in response to receiving a reset interrupt control signal, the status of the interrupt source means;

a primary interrupt delivery means for receiving and processing interrupt signals, the primary interrupt delivery means including:

means for altering, in response to receiving a reset signal, the status of the primary interrupt delivery means;

means for transmitting, in response to receiving the reset signal, the reset interrupt control signal;

means for transmitting, in response to receiving the reset signal, a master reset interrupt control signal;

means for discarding received interrupt signals that indicate a status different from that of the primary interrupt delivery means;

a plurality of secondary interrupt delivery means for receiving and processing interrupt signals, each one of the secondary interrupt delivery means including:

means for altering, in response to receiving the master interrupt control signal, the status of the secondary interrupt delivery means to that of the primary interrupt delivery means;

means for discarding received interrupt signals that indicate a status different from that of the primary interrupt delivery means; and means for transmitting to each one of the interrupt source means under the control of the secondary interrupt delivery means the reset interrupt control signal.

2. The apparatus of claim 1 wherein each one of the interrupt source means further includes:

a reset counter for indicating the status of the interrupt source means.

3. The apparatus of claim 2 wherein the reset interrupt control includes a reset value, and the means for altering, in response to receiving a reset interrupt control signal, the status of the interrupt source means includes:

means for altering, in response to receiving a reset interrupt control signal, the value of the reset counter to the reset value.

4. The apparatus of claim 3 wherein each one of the interrupt signals includes the value of the reset counter.

5. The apparatus of claim 4 wherein each one of the secondary interrupt delivery means further includes:

a secondary master reset counter having a value indicating the current status of the secondary interrupt delivery means.

6. The apparatus of claim 5 wherein the primary interrupt delivery means further includes:

a primary master reset counter having a value indicating the current status of the primary interrupt delivery means.

7. The apparatus of claim 6 wherein the reset value of the interrupt control signal is the same as the value of the primary master reset counter.

8. The apparatus of claim 7 wherein the master interrupt control signal includes the value of the primary master reset counter.

9. A method, in a multi-processor computer having a plurality of central processing units, of processing interrupts to each one of the central processing units, the method comprising the steps of;

creating a plurality of first interrupt signals using a first interrupt source unit, each one of the first interrupt signals indicating the status of the first interrupt source unit;

creating a plurality of second interrupt signals using a second interrupt source unit, each one of the second interrupt signals indicating the status of the second interrupt source unit;

assigning a first and second interrupt delivery unit to a first and second central processing unit, respectively;

resetting the first interrupt delivery unit so that the status of the first interrupt delivery unit is different from that of the first interrupt source unit;

transmitting, with the first interrupt delivery unit, a master reset signal to the second interrupt delivery unit;

altering, in response to receiving the master reset signal, the status of the second interrupt delivery unit to match that of the first interrupt delivery unit;

discarding each one of the first interrupt signals that indicate a status different from that of the first interrupt delivery unit; and discarding each one of the second interrupt signals that indicate a status different from that of the second interrupt delivery unit.

10. The method of claim 9 wherein the first interrupt source unit includes a first reset counter for indicating the status of the first interrupt source unit, and the step of creating a plurality of first interrupt signals includes the step of:

creating a plurality of first interrupt signals using the first interrupt source unit, each one of the first interrupt signals indicating the value of the first reset counter.

11. The method of claim 10 wherein the second interrupt source unit includes a second reset counter for indicating the status of the second interrupt source unit, and the step of creating a plurality of second interrupt signals includes the step of:

creating a plurality of second interrupt signals using the second interrupt source unit, each one of the second interrupt signals indicating the value of the second reset counter.

12. The method of claim 11 wherein the first interrupt delivery unit includes a first master reset counter for indicating the status of the first interrupt delivery unit, and the step of resetting the first interrupt delivery unit includes the step of:

resetting the first interrupt delivery unit so that the first master reset counter has a value different from that of the first reset counter.

13. The method of claim 12 wherein the second interrupt delivery unit includes a second master reset counter for indicating the status of the second interrupt delivery unit, and the step of resetting the second interrupt delivery unit includes the step of:

resetting the second interrupt delivery unit so that the second master reset counter is changed to have a value different from that of the second reset counter.

14. The method of claim 13 wherein the step of discarding each one of the first interrupt signals includes the step of:

discarding each one of the first interrupt signals indicating a value that is not equal to the value of the first master counter.

15. The method of claim 14 wherein the step of discarding each one of the second interrupt signals includes the step of:

discarding each of the second interrupt signals indicating a value that is not equal to the value of the second master reset counter.

16. The method of claim 15 wherein the step of creating a plurality of first interrupt signals includes the steps of:

creating, before the resetting of the first interrupt delivery unit, a first interrupt signal using the first interrupt source unit, the first interrupt signal indicating the reset value of the first reset counter; and creating, subsequent to the resetting of the first interrupt delivery unit, a second first interrupt signal using the first interrupt source unit, the second first interrupt signal indicating the reset value of the first reset counter.

17. The method of claim 16 wherein the step of creating a plurality of second interrupt signals includes the steps of:

creating, before the resetting of the second interrupt delivery unit, a first second interrupt signal using the second interrupt source unit, the first second interrupt signal indicating the value of the second reset counter; and creating, subsequent to the resetting of the second interrupt delivery unit, a second interrupt signal using the second interrupt source unit, the second interrupt signal indicating the reset value of the second reset counter.

18. The method of claim 17 wherein the step of discarding each one of the first interrupt signals includes the step of:

discarding the second first interrupt signal since the indicated value is different from the value of the first master reset counter.

19. The method of claim 18 wherein the step of discarding each one of the second interrupt signals includes the step of:

discarding the second interrupt signal since the indicated value is different from the value of the second master reset counter.

20. The method of claim 19 further comprising the step of:

processing the first interrupt signal since the indicated value is the same as the value of the first master reset counter.

* * * * *